United States Patent Office 2,763,088
Patented Sept. 18, 1956

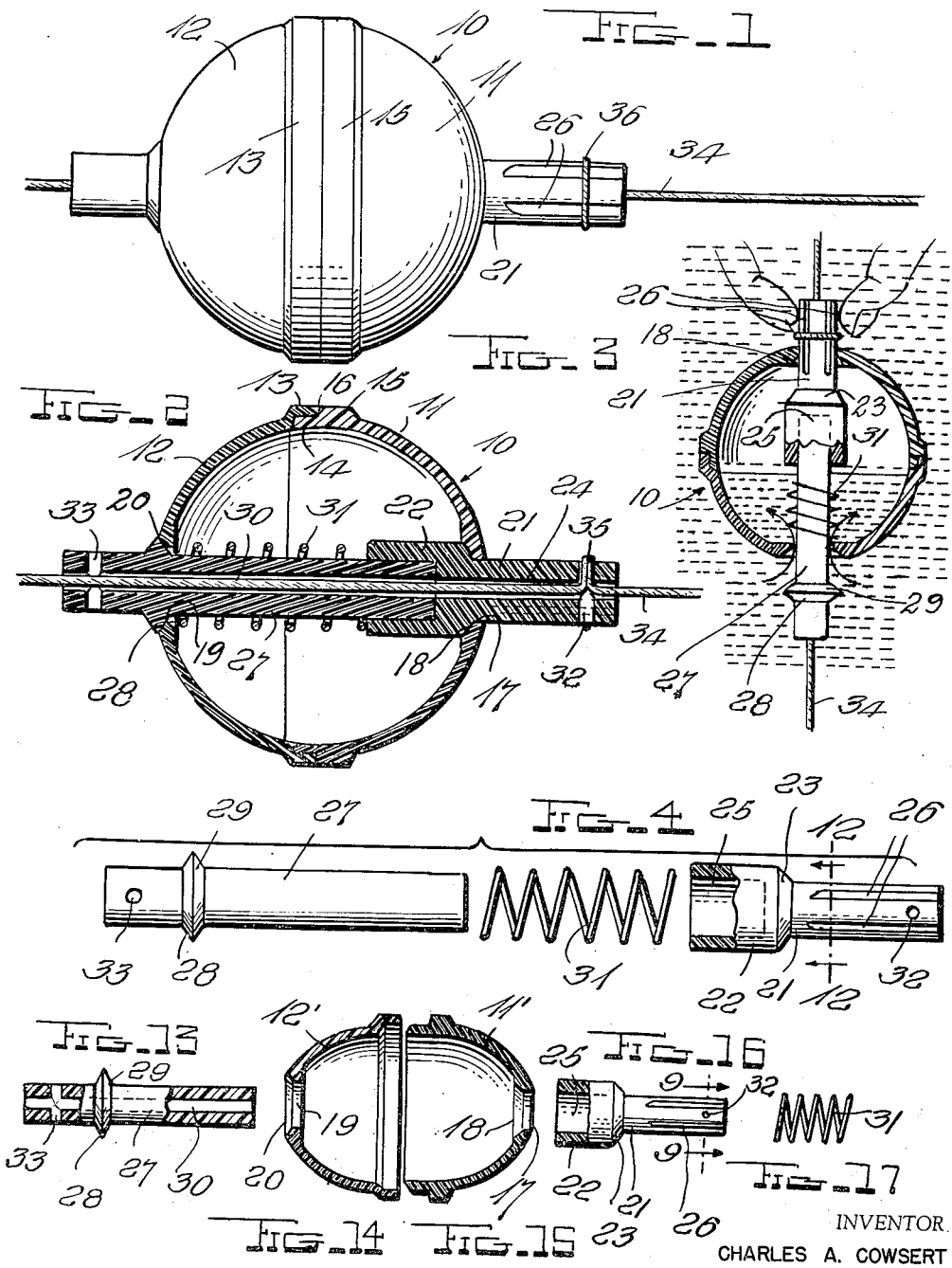

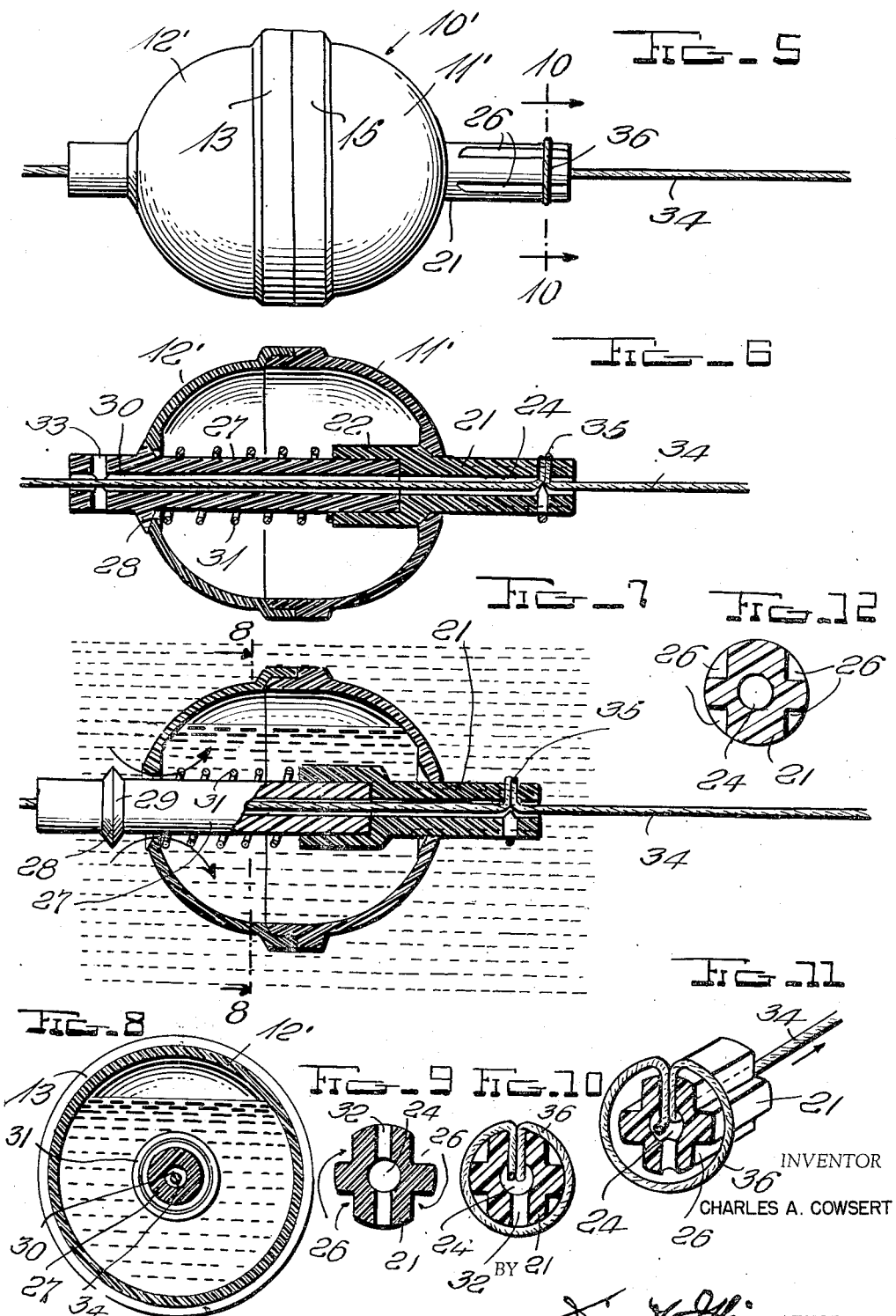

2,763,088

FISHING FLOAT HAVING REGULATING MEANS FOR ITS WATER DISPLACEMENT

Charles A. Cowsert, Miamisburg, Ohio, assignor to Buckeye Bait Corporation, Miamisburg, Ohio, a corporation of Ohio Application April 30, 1954, Serial No. 426,709

2 Claims. (Cl. 43—43.14)

The present invention relates to a fishing float having regulating means for its water displacement and it consists in the combinations, constructions and arrangements of parts herein described and claimed.

Generally there is provided a hollow fishing float having a novel valve extending entirely therethrough and provided with spring means for maintaining the same in normally closed condition. The device is such that pressure upon one end of the valve while the body is immersed or partly immersed in water will allow water to enter one end of the body while at the same time permitting the escape of the displaced air from the other end of the body. Water may be removed from the interior of the float body by the same means when the device is removed entirely from water. The device therefore provides a novel means whereby the position of the float in water may be regulated to a nicety and with a minimum of effort. The device contains many novel features which will be brought out in the specification.

It is accordingly an object of the invention to provide a fishing float having novel means for regulating its water displacement when in use.

Another object of the invention is to provide, in a device of the character set forth, a novel valve forming a part of the invention.

Another object of the invention is to provide, in a device of the character set forth, novel means for the admission or discharge of water and simultaneously operated means for discharge or admission of air thereto.

A further object of the invention is to provide, in a device of the character set forth, a novel channeled valve member forming a part of the invention.

A further object of the invention is to provide a device of the character set forth which is simple in construction, inexpensive to manufacture and yet effective and efficient in use.

Other and further objects of the invention will become apparent from a reading of the following specification taken in conjunction with the drawings, in which:

Figure 1 is a side elevational view of an embodiment of the invention wherein the body thereof is substantially spherical in shape, Figure 2 is a longitudinal sectional view thereof, Figure 3 is a reduced sectional view, partly in elevation and partly broken away, illustrating the manner of use of the device, Figure 4 is an exploded elevational view, partly broken away, of a valve structure forming a part of the invention, Figure 5 is a view similar to Figure 1 but showing the device with an ovular shaped body, Figure 6 is a longitudinal sectional view of Figure 5, Figure 7 is a view similar to Figure 6 but showing the valve structure in open condition, Figure 8 is a sectional view taken along line 8—8 of Figure 7, Figure 9 is an enlarged sectional view taken along line 9—9 of Figure 16, Figure 10 is an enlarged sectional view taken along line 10—10 of Figure 5, Figure 11 is a fragmentary perspective view of that portion of the invention illustrated in Figure 10, Figure 12 is an enlarged sectional view taken along line 12—12 of Figure 4, Figure 13 is an elevational view, partly broken away, of a water valve forming a part of the invention, Figures 14 and 15 are sectional views of portions of a body structure forming a part of the invention, Figure 16 is an elevational view, partly broken away, of an air valve forming a part of the invention, and Figure 17 is an elevational view of a spring forming a part of the invention.

Referring more particularly to the drawings, there is shown therein, in Figures 1 to 3, inclusive, a hollow float of spherical shape generally indicated at 10 and formed of a pair of complementary parts 11 and 12. The part 12 is provided at its peripheral edge portion with an annular flange 13 which is adapted to receive therein the peripheral portion 14 of the part 11. The part 11 is provided, inwardly of its peripheral portion 14 with a thickened portion 15 providing a shoulder 16 against which the edge of the flange 13 is adapted to rest and it is contemplated that the parts 11 and 12 may be permanently joined together by the application of a suitable adhesive between the overlapping portions of the parts 11 and 12.

The part 11 is centrally apertured as indicated at 17 and the inner end portion of the wall of the aperture is shaped to provide a valve seat 18 while the part 12 is centrally apertured, as indicated at 19, and the outer end portion of the wall of the aperture is shaped to provide a valve seat 20.

A cylindrical member 21 extends slidably through the opening 17 and is provided with an enlarged inner end 22 having a valve face 23 adapted to seat upon the seat 18. The member 21 is provided with a central passage 24 having an enlarged portion 25 at its inner end and the outer surface of the member 21 is provided with a series of circumferentially spaced longitudinally extending grooves 26 which extend inwardly for a distance from the outer end thereof terminating at points which normally lie without the opening 17 as will hereinafter be described.

A cylindrical member 27 extends slidably through the opening 19 and is provided adjacent its outer end with an enlarged portion 28 whose inner face 29 forms a valve adapted to seat upon the seat 20. The member 27 is provided with a centrally disposed longitudinally extending passage 30 and the inner end portion of the cylindrical member 27 is snugly received in the enlarged portion 25 of the passage 24 of member 21. A compression spring 31 surrounds that portion of the cylindrical member 27 lying within the float 10 and bears against the inner wall of the part 12 at one of its ends and against the inner edge of the enlarged portion 22 of the member 21 at its other end.

A diametrically extending opening 32 extends through the member 21 adjacent the outer end thereof and, of course, communicates with the passage 24. A like transverse opening 33 extends through the member 27 adjacent its outer end and, of course, communicates with the passage 30. A fishing line is shown at 34.

In the form of the invention illustrated, in Figures 5 to 8, inclusive, the construction is identical with that above described with the exception that the float 10' therein shown is ovular in shape and the component parts 11' and 12' together form the ovular shape of the float. The remainder of the construction in this form of the invention is identical with that above described with regard to the form of the invention illustrated in Figures 1 to 3, inclusive, and has therefore been given identical reference characters.

In the operation of the device, it will be apparent that it may be attached to a fishing line 34 by extending the line through the combined passages 24 and 30 in the cylindrical members 21 and 27 and that thereafter a portion of such line 34 may be drawn outwardly through the opening 32 or the opening 33, as shown by way of example in Figures 2 and 7 at 35 and that the loop thus formed may be extended around the member 21 or 27 as the case may be as illustrated, by way of example, in Figures 1, 5, 10 and 11 at 36, to thus prevent the device from slipping along the line 34. In order to regulate the effective displacement of the device in water, the device may be immersed in water with the member 27 presented in a downward direction, as viewed in Figure 3, whereupon the cylindrical member 21 may be pressed downwardly by one of the fingers of the user to thereby unseat the valves 29 and 23, the former allowing water to pass into the float 10 or 10' as the case may be through the opening 19 while the latter will allow the thus displaced air within the float to pass through the opening 17. It will be apparent that the amount of water thus admitted to the interior of the float body may be easily regulated by the length of time the valves are thus allowed to remain open against the action of the spring 31 and that further, the release of pressure upon the member 21 will allow the spring 31 to again close both valves. It will also be seen that when it is desired to let out of the float body some or all of the water theretofore admitted to such body, it is only necessary to remove the device from water and, again assuming the position shown in Figure 3, to then press downwardly upon the cylindrical member 21 thus allowing air to enter the opening 17 to thereby displace the water therein contained whereupon the water in the body will pass downwardly by gravity through the opening 19.

While but two forms of the invention have been shown and described herein, it will be readily apparent to those skilled in the art that many minor modifications may be made without departing from the spirit of the invention or the scope of the appended claims.

What is claimed is:

1. A device of the character described comprising a hollow float body diametrically divided into a pair of complementary parts and having a centrally disposed opening in each part, the inner end portion of the wall of one opening providing a valve seat, the outer end portion of the wall of the other opening providing a valve seat, a first cylindrical member slidably mounted in said one opening and having an enlarged inner end, a valve formed on said enlarged portion adapted to seat on the valve seat of the one opening, a second cylindrical member slidably mounted in the other opening, a valve formed on said second cylindrical member and adapted to seat upon the valve seat of the other opening, said second cylindrical member having its inner end positioned in said enlarged portion, and a compression spring surrounding said second cylindrical member and bearing at one end against said enlarged portion and at its other end against the inner wall of said body.

2. A device of the character described comprising a hollow float body diametrically divided into a pair of complementary parts and having a centrally disposed opening in each part, the outer end portion of the wall of one opening providing a valve seat, a first cylindrical member slidably mounted in the other opening and having an enlarged inner end, a second cylindrical member slidably mounted in said one opening, a valve formed on said second cylindrical member and seatable in said valve seat, said second cylindrical member having its inner end positioned in said enlarged portion, and a compression spring surrounding said second cylindrical member and bearing at one end against said enlarged portion and at its other end against the inner wall of said body, said first cylindrical member being provided with a plurality of circumferentially spaced longitudinal grooves extending from the outer end thereof to points normally exterior to the adjacent opening in said body.

References Cited in the file of this patent

UNITED STATES PATENTS

| 322,088 | Behrens | July 14, 1885 |
| 1,056,494 | Blee et al. | Mar. 18, 1913 |
| 1,504,065 | Lower | Aug. 5, 1924 |
| 2,509,704 | Streitwieser | May 30, 1950 |
| 2,527,437 | Matras | Oct. 24, 1950 |